United States Patent

Tomozawa

[15] 3,659,090

[45] Apr. 25, 1972

[54] ADDITION OR SUBTRACTION CIRCUIT FOR THE GRAY CODES BASED ON THE MODULUS OF 4

[72] Inventor: Atsushi Tomozawa, Tokyo, Japan

[73] Assignee: Nippon Electric Company, Limited, Tokyo, Japan

[22] Filed: Dec. 14, 1970

[21] Appl. No.: 97,791

[30] Foreign Application Priority Data

Dec. 20, 1969 Japan ....................44/102727

[52] U.S. Cl. ....................235/176
[51] Int. Cl. ....................G06f 7/50
[58] Field of Search ....................235/176, 92 GD; 307/216

[56] References Cited

UNITED STATES PATENTS 3,349,332 10/1967 Blerckardt ....................235/92 GD
3,515,341 6/1970 Frick ....................235/92 GD

*Primary Examiner*—Malcolm A. Morrison
*Assistant Examiner*—David H. Malzahn
*Attorney*—Sandoe, Hopgood & Calimafde

[57] ABSTRACT

A logic circuit effects addition or subtraction of modulus 4 between two two-digit binary quantities of a gray encoding. The circuit employs a logic switching circuit, and three exclusive OR gates. One exclusive OR gate provides a digital control signal for the switching configuration, while the remaining such gages provide input binary signals thereto.

3 Claims, 7 Drawing Figures

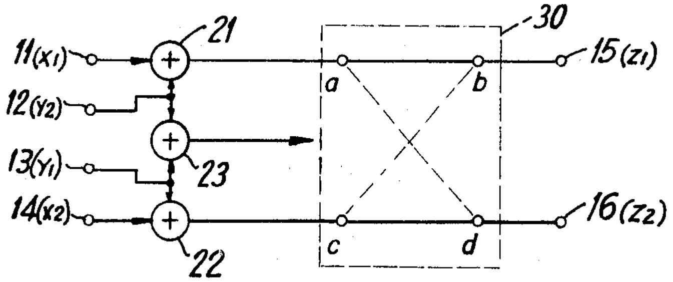
FIG. 1
| $X_1X_2$ \ $Z_1Z_2$ \ $Y_1Y_2$ | 00 | 01 | 11 | 10 |
|---|---|---|---|---|
| 00 | 00 | 01 | 11 | 10 |
| 01 | 01 | 11 | 10 | 00 |
| 11 | 11 | 10 | 00 | 01 |
| 10 | 10 | 00 | 01 | 11 |
FIG. 2a
| X \ Z \ Y | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |
FIG. 2b
| $X_1X_2$ \ $Z_1Z_2$ \ $Y_2Y_1$ | 00 | 01 | 11 | 10 |
|---|---|---|---|---|
| 00 | 00 | 10 | 11 | 01 |
| 01 | 01 | 00 | 10 | 11 |
| 11 | 11 | 01 | 00 | 10 |
| 10 | 10 | 11 | 01 | 00 |
FIG. 3a
| X \ Z \ Y | 0 | 1 | 2 | 3 |
|---|---|---|---|---|
| 0 | 0 | 3 | 2 | 1 |
| 1 | 1 | 0 | 3 | 2 |
| 2 | 2 | 1 | 0 | 3 |
| 3 | 3 | 2 | 1 | 0 |
FIG. 3b
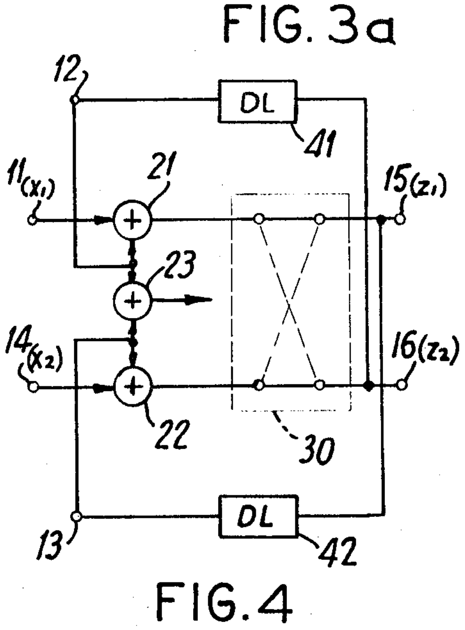
FIG. 4
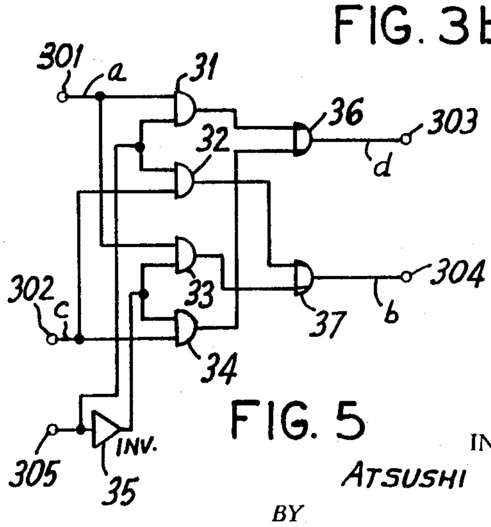
FIG. 5
INVENTOR.
ATSUSHI TOMOZAWA
BY
Sandoe, Hopgood & Calimafde
ATTORNEYS

ADDITION OR SUBTRACTION CIRCUIT FOR THE GRAY CODES BASED ON THE MODULUS OF 4

This invention relates to arithmetic circuits employing gray code logic and, more specifically, to quaternary addition or subtraction circuits for the gray code.

In a pulse code communication system, particularly in a communication system using 4-phase phase modulation, it is often the case that the status of each phase is identified by a gray code because of the constructions of a modulator and a demodulator therein. In such a system using this form of modulation and demodulation, it is obvious that the use of the gray code is desirable for computation on the code to be transmitted. Detailed descriptions of "gray codes" are given in the article entitled "The Logic Design of Transistor Digital Computers" by Gerald A. Maley and John Earle (Prentice-Hall Inc., 1963, pp.24 – 26).

In the prior art, arithmetic operations based on the gray code are effected by converting the input code into a natural binary code, performing the computation using the natural code, and then converting the resultant output back into the gray code.

Correspondingly, the present invention permits computation directly in the gray code domain, thus making it possible to realize a structurally simple arithmetic circuit with a reduced number of circuit elements.

The invention will be better understood from the following detailed description of a specific illustrative embodiment thereof, presented hereinbelow in connection with the accompanying drawings, wherein:

FIG. 1 is a block diagram showing a circuit for addition or subtraction according to the present invention;

FIGS. 2(*a*), 2(*b*), 3(*a*) and 3(*b*) are logic tables showing input/output states for the circuits shown in FIG. 1;

FIG. 4 is a block diagram showing an adding circuit of this invention; and

FIG. 5 is a circuit diagram showing an example of the switching circuit as in FIG. 1.

Referring now to FIG. 1, the reference numerals 11, 12, 13 and 14 denote input terminals, and 21, 22 and 23 are exclusive OR circuits. The numeral 30 denotes a switching circuit responsive to a control signal supplied from the exclusive OR circuit 23. When the control signal is "0,"the terminal *a* is connected to the terminal *b*, and the terminal *c* is connected to the terminal *d*. When the control signal is a digital "1," the terminal *a* is coupled to *d*, and *c* to *b*.

FIG. 2 *a* shows the relationship between the input and output gray codes. Input gray codes ($X_1$, $X_2$) are applied to the input terminals 11 and 14 (FIG. 1), and other input gray codes ($Y_1$, $Y_2$) to the terminals 13 and 12 (FIG. 1). Output gray codes ($Z_1$, $Z_2$) are then obtained at the output terminals 15 and 16 in FIG. 1. It is assumed that the gray codes ($X_1$, $X_2$) and ($Y_1$, $Y_2$) are of two-digit binary value, wherein the first digit is the most significant digit. Also it is assumed that four states are expressed by the two digits according to the known principle of the gray code.

FIG. 2 *b* shows the relationship between the input and output gray codes as in FIG. 2 *a*, expressed in terms of numerals O through 3 corresponding to said four states. FIG. 2 *b* shows the fact that this circuit performs an addition operation based on a modulus of 4 with respect to the inputs X and Y.

FIG. 3 *a* shows the relationship between the input and output gray codes, the gray code digits (X*1*, X*2*) are applied to the input terminals 11 and 14 similar to the above considered case. Other gray code digits ($Y_1$, $Y_2$) are applied to the input terminals 12 and 13 i.e., the most significant digits of code Y are applied to the terminal 12, and the least significant digits to the terminal 13). This relationship may be expressed by the table of FIG. 3 *b* in terms of numerals 0 through 3 corresponding to the four states. The circuit operative in accordance with the logic state diagrams of FIGS. 3 *a* and 3 *b* thus functions as a subtractor (X–Y) based on a modulus of 4.

In other words, the circuit of FIG. 1 is capable of addition and subtraction based on the modulus of 4 using gray codes. The switching circuit 30 may be formed by the use of logical circuits as shown in FIG. 5. Referring to FIG. 5, the control signal is applied to the terminal 305. This control signal and its inverse signal from an inverter 35 are supplied to corresponding pair of AND-gates 31 and 32 or 33 and 34, respectively. The input signals are applied to the input terminals 301 and 302. When the control signal is "O," the signals applied to the terminal 301 pass to the terminal 304 by way of gates 33 and 37, and the signals applied to the terminal 302 flow to the terminal 303 by way of gates 34 and 36. When the control signal is a "1," the signals applied to the terminals 301 and 302 go to the terminals 303 and 304 by way of gates 31 and 36, and gates 32 and 37, respectively.

It may be understood that when the terminals 301, 304, 302 and 303 in FIG. 5 correspond to the terminals *a*, *b*, *c* and *d* in FIG. 1, this circuit corresponds to the switching circuit 30 in FIG. 1.

Referring to FIG. 4, there is shown another adding circuit to which the principle of this invention is applied. The output codes are fed back as second inputs (Y) via the delay elements 41 and 42, thus forming an addition circuit based on the modulus of 4. In the practical system having such a feedback circuit, it is necessary to gate the loop at a constant clock pulse rate, or to use a shift register operable by a clock pulse, for the delay element in order to prevent free running due to the feedback circuit. Circuitry of the FIG. 4 class can be readily formed by known technology, and hence a further detailed explanation thereof is omitted.

What is claimed is:

1. An addition - subtraction circuit for gray code computation, based on a modulus of 4, comprising:
   - first, second, third and fourth input terminals supplied with first, second, third and fourth input binary signals, respectively;
   - a first exclusive OR circuit coupled to the first and second input terminals;
   - a second exclusive OR circuit coupled to the second and third input terminals;
   - a third exclusive OR circuit coupled to the third and fourth input terminals;
   - a switching circuit coupled with the output terminals of said first, second and third exclusive OR circuits; and
   - first and second output terminals coupled to the output terminals of said switching circuit;
   - said switching circuit including means responsive to the binary state at the output of said second exclusive-OR circuit for connecting the output terminals of said first and third exclusive OR circuits to said first and second output terminals; or for connecting the output terminals of said first and third exclusive OR circuits to said second and first output terminals.

2. A combination as in claim 1 wherein said switching circuit comprises first and second pairs of AND logic gates, means for enabling a selected one of said AND gate pairs, means for connecting the output of said first exclusive OR circuit to one AND gate in each pair thereof, and means for connecting the output of said third exclusive OR circuit to the other AND gate in each pair thereof.

3. A combination as in claim 2 wherein said switching circuit further comprises OR logic means connecting the outputs of one AND gate in each pair thereof to said first output terminal, and additional OR logic means connecting the output of the other AND gate in each pair thereof to said second output terminal.

* * * * *